United States Patent
Trond (10) Patent No.: US 10,126,835 B2
(45) Date of Patent: Nov. 13, 2018

(54) CONTACT INTERFACE INPUT DEVICE

(71) Applicant: INTAFIN AS., Fetsund (NO)

(72) Inventor: Syversen Trond, Fetsund (NO)

(73) Assignee: INTAFIN AS., Fetsund (NO)

(*) Notice: Subject to any disclaimer, the term of this patent is extended or adjusted under 35 U.S.C. 154(b) by 44 days.

(21) Appl. No.: 14/762,822

(22) PCT Filed: Jan. 23, 2014

(86) PCT No.: PCT/NO2014/000004
§ 371 (c)(1),
(2) Date: Jul. 23, 2015

(87) PCT Pub. No.: WO2014/116118
PCT Pub. Date: Jul. 31, 2014

(65) Prior Publication Data
US 2015/0378448 A1    Dec. 31, 2015

(30) Foreign Application Priority Data

Jan. 23, 2013 (NO) .................................. 20130125

(51) Int. Cl.
*G06F 3/033*   (2013.01)
*G06F 3/01*   (2006.01)
*G06F 3/0362*   (2013.01)
*G06F 3/041*   (2006.01)
*G06F 3/0354*   (2013.01)
*A44C 9/00*   (2006.01)

(52) U.S. Cl.
CPC ............. *G06F 3/033* (2013.01); *G06F 3/014* (2013.01); *G06F 3/0362* (2013.01); *G06F 3/03545* (2013.01); *G06F 3/041* (2013.01); *A44C 9/0061* (2013.01); *G06F 2203/0331* (2013.01)

(58) Field of Classification Search
CPC ...... G06F 3/033; G06F 3/0338; G06F 3/0346; G06F 3/0354; G06F 3/014; G06F 3/03543; G06F 3/03541; G06F 2203/0335; G06F 2203/0331; G06F 2203/04108; H04B 2001/3861
See application file for complete search history.

(56) References Cited

U.S. PATENT DOCUMENTS

| 6,249,277 | B1* | 6/2001 | Varveris | G06F 3/039 |
| | | | | 294/25 |
| 2003/0184521 | A1* | 10/2003 | Sugita | G06F 3/03543 |
| | | | | 345/163 |
| 2005/0062730 | A1* | 3/2005 | Birecki | G06F 3/03545 |
| | | | | 345/179 |
| 2010/0188326 | A1* | 7/2010 | Dines | G06F 3/014 |
| | | | | 345/156 |

(Continued)

*Primary Examiner* — Kumar Patel
*Assistant Examiner* — Amen Bogale
(74) *Attorney, Agent, or Firm* — Mark M. Friedman (57) ABSTRACT

The present invention relates to a pointer device for operation of interactive screen surfaces, comprising: a closed ring (10) or a ring shaped segment for placement on a finger, where the ring or ring-shaped segment comprises a extractable pointer device (11, 21, 68), where the pointer device is adapted for interaction with a touch-sensitive screen in that the extractable pointer device has an end face functioning as an interface with interactive screens where the end face is less than 25 mm2.

7 Claims, 7 Drawing Sheets

(56) References Cited

U.S. PATENT DOCUMENTS

2012/0075196 A1* 3/2012 Ashbrook .............. G06F 3/014
   345/173
2013/0257759 A1* 10/2013 Daghigh .............. G06F 3/0412
   345/173

* cited by examiner

CONTACT INTERFACE INPUT DEVICE

TECHNICAL FIELD

The present invention relates to a pointer device for operation of interactive screen surfaces.

BACKGROUND OF THE INVENTION

Today, a diversity of screens and interactive surfaces are operated by inactive or active electronic pens, in addition to the use of fingertips. Interactive screens and surfaces such as on mobile telephones, navigation, signing, admission and control systems, tablet PCs, tablets, interactive boards, writing and drawing tablets.

Pens can disappear and it is time consuming to find them or loosen them from a holder on place.

Where the technology demands the use of pens, it is required with a storing place for the pen. Interactive products are designed with a placeholder for pen, alternatively are the pens kept in external placeholder or loose. Pens can disappear and it is time consuming to find them or loosen them from the placeholders.

Devices such as Smartphones, tablets or the like with interactive screen surfaces are furnished with active icons and active virtual buttons, a limitation for developers of user interface is the users lack of ability to "hit" small icons or virtual buttons on an interactive screen. The use of finger tips on icons and connections has uncertainty linked to precision/hits. The same relates to situations where it is important to get the right insertion point in text and tables. With a tool giving a better precision in interaction with an interactive screen, the developers of user interfaces will provide the user with broader and more alternatives as the icons or the like can be packed closer to each other. A better precision will provide the possibility to use advanced tools, such as drawing tools on small interactive screens which is not possible today.

SUMMARY OF THE INVENTION

It is an object according to the present invention to provide a device solving the above mentioned problems.

A device according to the present invention gives the producers of software increased space for data and information on surfaces and does not have a need for placeholders or place for pens. The consumer is given reduced need for cleaning of writing or operational surfaces. The user is given reduced loss of time as a consequence of inaccurate navigation with finger tips. The pointer device according to the present invention gives time-saving as it is operative faster than loose pens and cost saving as the problem of loose pens which frequently disappear is reduced.

A plurality of interactive units also demands a plurality of tools. The pointer device according to the present invention is a technology and a plurality of tools unified as a functional unit.

Compared to the pointer device according to the present invention does a fingertip provide relatively little precision when it is necessary to write on an interactive surface. Even if it is technically possible to produce small surfaces with high precision, does a fingertip have a relatively large area and low precision compared to the tip of a pen. The pointer device according to the present invention provides precision.

The use of finger tips on interactive systems can be regarded as unhygienic. Hygiene can be a weighty factor in use of interactive boards on schools, kinder gardens and enterprises. Hygiene can also be a weighty factor in admission control and operational systems in the private sector and in public, such as for example hospitals.

The pointer device according to the present invention is a quickly accessible tool with a high degree of accuracy and which ensures quick activation of desired functions for the user. The pointer device according to the present invention ensures correct point of insertion when writing and navigating and reduces the need for a step backwards in the process. Increased accuracy makes it possible to arrange more objects on a surface and gives a good utilisation when navigating.

According to one aspect of the invention is a pointer device for operation of interactive screen surfaces provided, comprising:

a closed ring or a ring shaped segment for placement on a finger, where the ring or ring-shaped segment comprises a extractable pointer device, where the pointer device is adapted for interaction with a touch-sensitive screen in that the extractable pointer device has an end face functioning as an interface with interactive screens where the end face according to an aspect of the present invention is less than 25 $mm^2$.

According to an aspect of the pointer device, does the pointer device comprise an outer ring and an inner ring defining a void there between.

According to a second aspect of the pointer device, does the pointer device comprise an outer ring and an inner ring defining a void, which void is provided with an inner spool ring, where the inner spool ring is adapted to be movable in relation to the inner and outer ring, the spool ring is furthermore adapted to receive a wire/cord being connected to a pointer element.

According to a further aspect of the pointer device, the pointer device comprises a ring with a ring extension arranged adjacent to the shoulder of the ring, the ring extension is integrated in the ring, the ring extension comprises an elongated groove running coaxially or approximately coaxially with the ring, at a first end of the ring extension there is provided a hole in the ring extension, through this hole there is arranged a wire/cord being adapted for use as a pointer tool for touch sensitive screens. The wire/cord can be retracted and extracted from the hole in the ring extension, at one end of the wire/cord being coupled to the ring extension, there is arranged a button, the button being slidably arranged in the ring extension in the groove is such a way that the wire/cord can be retracted or extracted in and out of the ring extension.

Further characteristics of the present invention will be apparent from the dependent claims.

SHORT DESCRIPTION OF THE FIGURES

To facilitate understanding of the invention, the following description will refer to the attached drawings, where.

DETAILED DESCRIPTION OF THE INVENTION

The present invention will now be described in detail with reference to the figures. In the following there will be given a general description of a pointer device arranged in a ring or on a ring.

The pointer device according to the present invention is an operational and writing tool for interactive screens and surfaces. A technology where a tip of a pen is attached to a ring sitting on a finger. The pointer device according to the present invention refines the qualities of the fingertip as a writing and operational tool and maintains an overall need for active and inactive pens.

In the following description will pen, the pen, the tip of the pen and pointer element all be used as a description of the part of the pointer device according to the present invention that is adapted for interaction with touch sensitive screens/surfaces. With the pointer device it is meant a combination of the pointer element in itself and the belonging ring.

Figure 1:
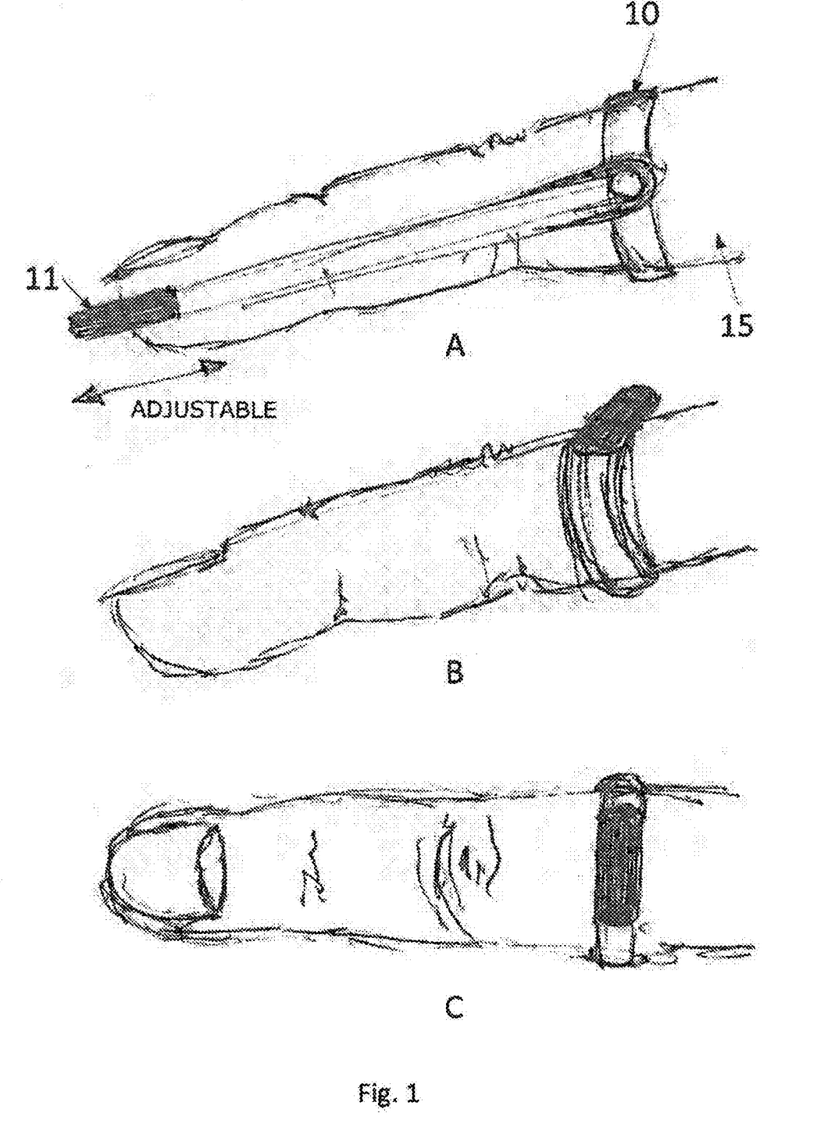
FIG. 1 shows a schematic view of a pointer device according to one embodiment of the invention.

FIGS. 1a-c shows an example of a pointer device according to the present invention. In FIG. 1a is the ring 10 seen attached to a finger 15 with an adjustable extracted pointer element 11. FIGS. 1b and c shows the same ring with the pointer element 11 retracted into the ring 10.

The pointer device according to the present invention is multifunctional, quickly accessible, precise, accurate, hygienic and time and cost saving. A users overall need for electronic operation and writing tools in 2D and 3D systems is covered by a pointer device according to the present invention on a finger.

The pointer device according to the present invention has a hibernation mode and a user mode. In user mode is the tip of the pen, the pointer element 11, held between index finger and thumb for writing and operation. The other end of the tip of the pen is attached to the ring 10. In hibernation mode, the pointer device according to the present invention has the shape and function of a ring on a finger 15.

The purpose of having the pointer device in hibernation mode on the finger as a ring, is to ensure quick access for the user to the functionalities the user requires, and that constitutes the pointer device according to the present invention in user mode. Functionality can be changed from hibernation mode to user mode with one continuous and natural movement for the finger. If the pointer device according to the present invention is put on the index finger, the thumb is pushed towards the pen element, rotating the upper layer of the ring, which the pen element is attached to. Thereafter, the pen element is turned and the pen tip is pulled in a continuous movement forward, until it is situated between the index finger and the thumb.

For operational tasks that does not require that the pen tip is held between the fingers, for example NFC (Near Field Communication), can the pointer device according to the present invention be changed from hibernation mode to user mode with only a rotation of the pen element. The pointer device according to the present invention is comfortable and a natural part of the hand in hibernation mode as it sits on the index fingers second or third joint or on the second joint on the thumb. The joint closest to the hand.

The pointer device according to the present invention is a complete solution with a two-layer ring being attached to the finger joint closes to the hand, and the solution can be transformed to a pen covering active and passive communication with interactive screens and systems.

Alternative methods for transforming is thinkable in that the pen element is attached to the ring and can be folded, turned, twisted or pushed. The ring part can include two layers—two rings rotating ungraded around each other. The inner ring is resting towards the skin. The outer movable part functions as an anchoring for the movable pen element.

Figure 2:
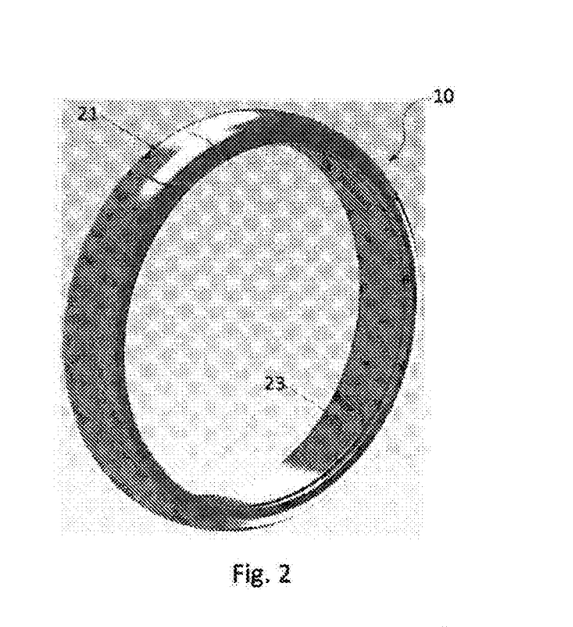
FIG. 2 shows an embodiment of a pointer device in a ring according to a second embodiment of the present invention.
Figure 3:
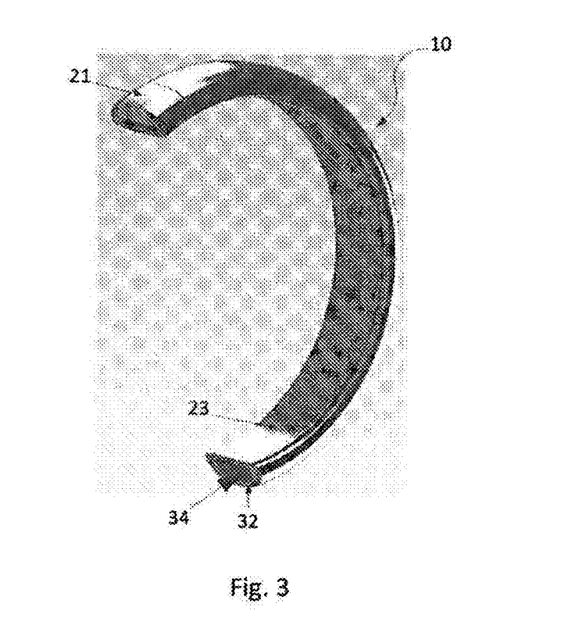
FIG. 3 shows a section of a pointer device in the ring shown in FIG. 2.

FIG. 2 and FIG. 3 shows a second embodiment of a pointer device according to the present invention. The second embodiment of the present invention comprises a ring 20 with a pointer tip (pointer element) 21 adapted for attachment to the ring 20. The pointer element 21 is designed so that it can be trapped in the ring 20. The pointer element is provided with a wire/cord which is not shown in FIG. 2 or 3. This wire/cord makes it possible for the pointer element 21 to be extracted from the ring 20 and simultaneously be mechanically connected to the ring 20. FIG. 3 shows that the ring 20 comprises an inner 33 and outer ring 32. The inner ring can be movable in relation to the outer ring in one embodiment. Between the inner 33 and outer ring 32, there is provided a cavity 34 suitable for receiving the above mentioned wire/cord.

Figure 4:
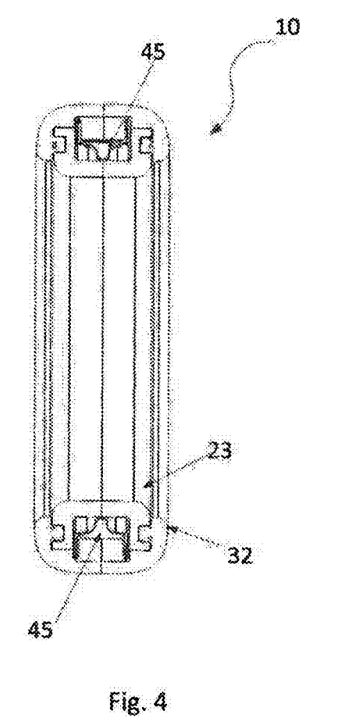
FIG. 4 shows a cross section of a ring for a pointer device according to a third embodiment of the present invention.
Figure 5:
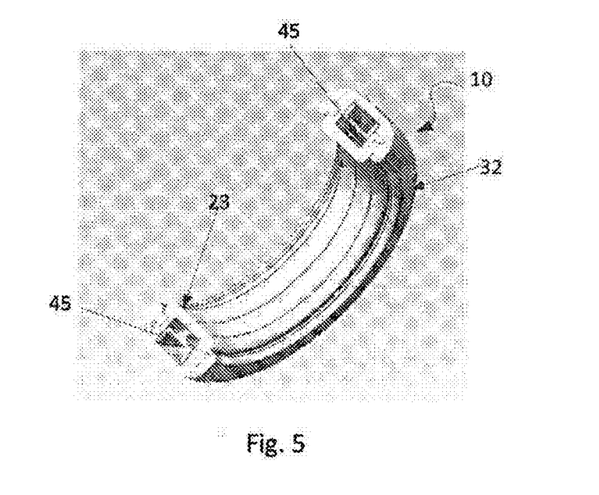
FIG. 5 shows a cross section of the ring in FIG. 4 seen from another angle.
Figure 6:
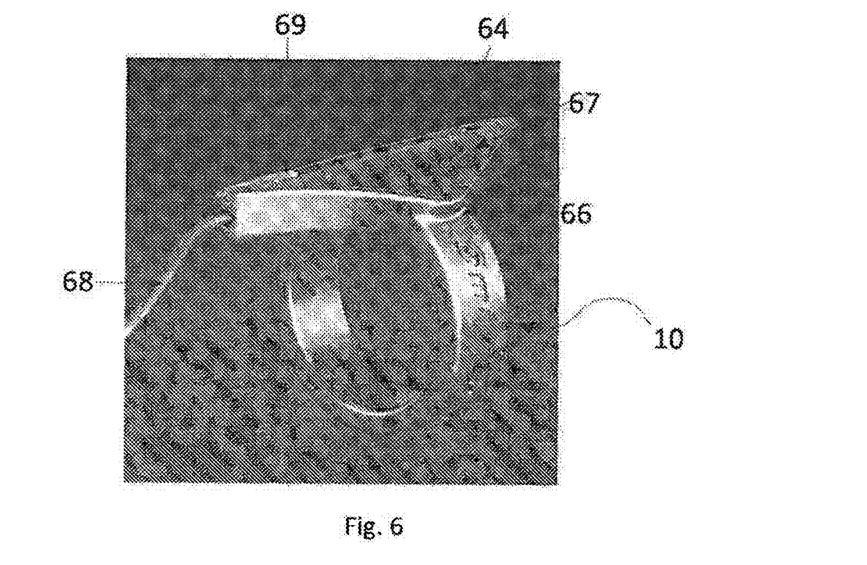
FIG. 6 shows an embodiment of a pointer device in a ring according to a fourth embodiment of the present invention.
Figure 7:
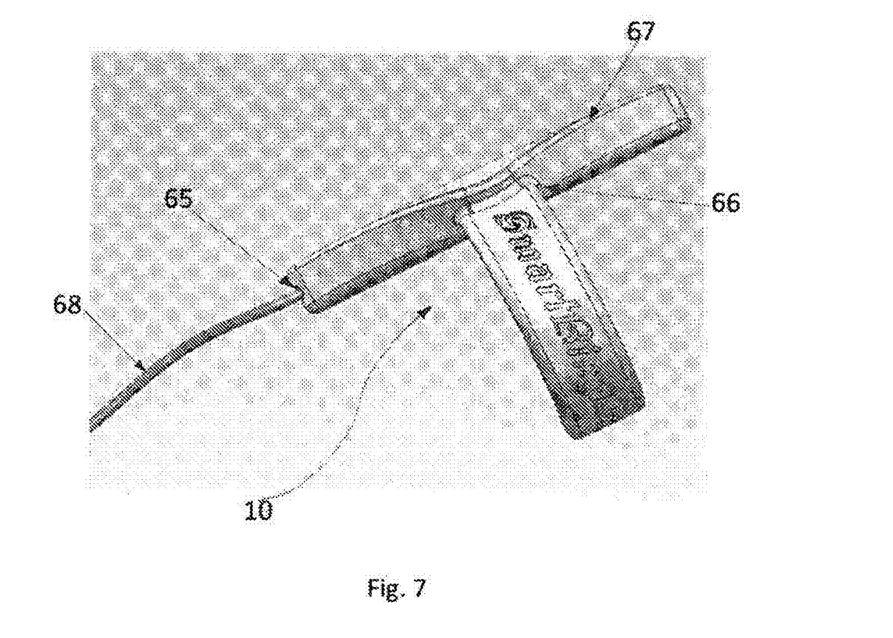
FIG. 7 shows the ring in FIG. 6 seen from another angle.

FIGS. 4 and 5 shows a third embodiment of a pointer device according to the present invention. The third embodiment of the present invention comprises a ring 40 comprising an inner ring 43, an outer ring 42 and a free running ring 45 arranged in a cavity formed between the inner ring 43 and the outer ring 42. The free running ring 45 can form a spool for a wire/cord to a pointer device. The pointer device in itself is not shown on FIG. 4 or 5, but is can for example be designed as suggested for the second embodiment shown in FIG. 2.

Figure 8:
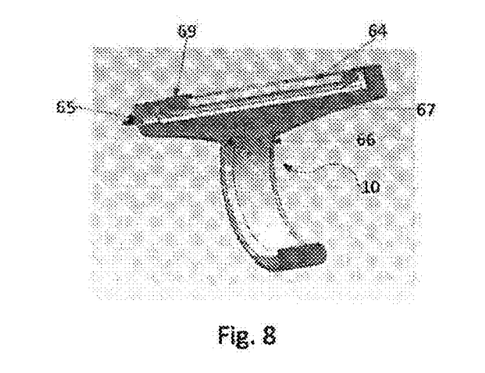
FIG. 8 shows a cross section of the ring in FIG. 6.
Figure 9:
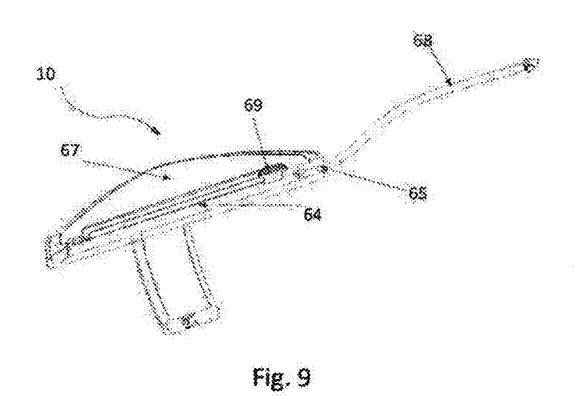
FIG. 9 shows a cross section of the ring in FIG. 6.
Figure 10:
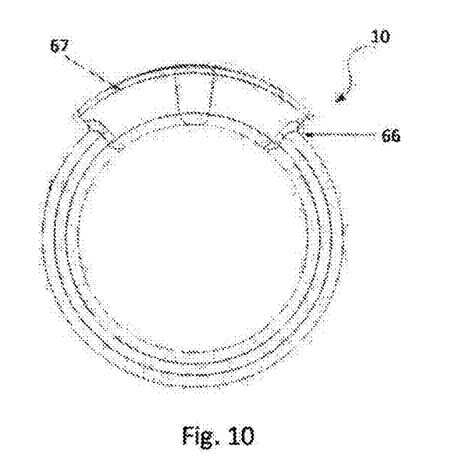
FIG. 10 shows the ring in FIG. 6 seen from another angle.

FIGS. 6-10 shows a fourth embodiment of a pointer device according to the present invention. The fourth embodiment of the present invention comprises a ring 60 with a ring extension 67 arranged adjacent to the shoulder 66 of the ring. The ring extension 67 is integrated in the ring 60. The ring extension 67 comprises an elongated groove 65 running coaxially or approximately coaxially with the ring 60. At a first end 65 of the ring extension 67, a hole is provided in the ring extension 67, through which hole there is arranged a wire/cord 68 adapted for use as pointer tool for touch sensitive screens. The wire/cord 68 can be retracted or extracted in and out of the hole in the ring extension ring extension 67. At the end of the wire/cord 68 being attached to the ring extension ring extension 67, there is provided a button 69, the button 69 is slidably arranged in the ring extension 67 in the groove, ref. FIGS. 8 and 9. FIGS. 8 and 9 shows a cross section of the ring 60. FIG. 10 shows the ring seen parallel to a virtual axis extending coaxially with the ring 60.

Figure 11:
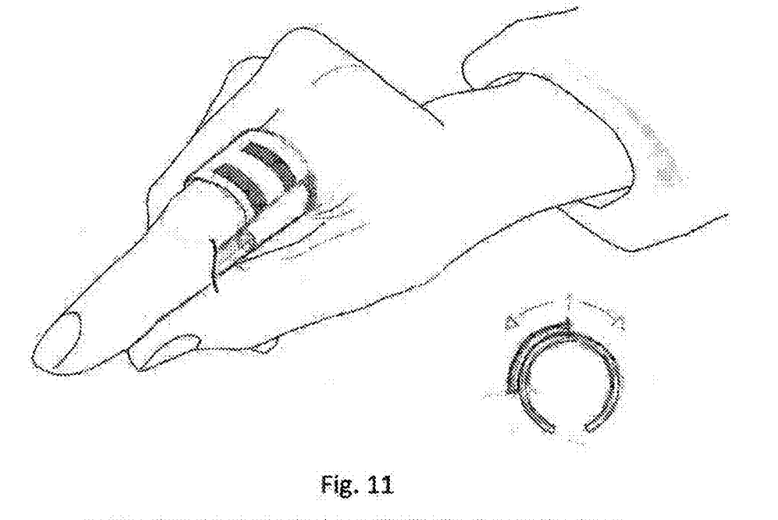
FIG. 11 shows an embodiment of a pointer device in a ring according to a fifth embodiment of the present invention.
Figure 12:
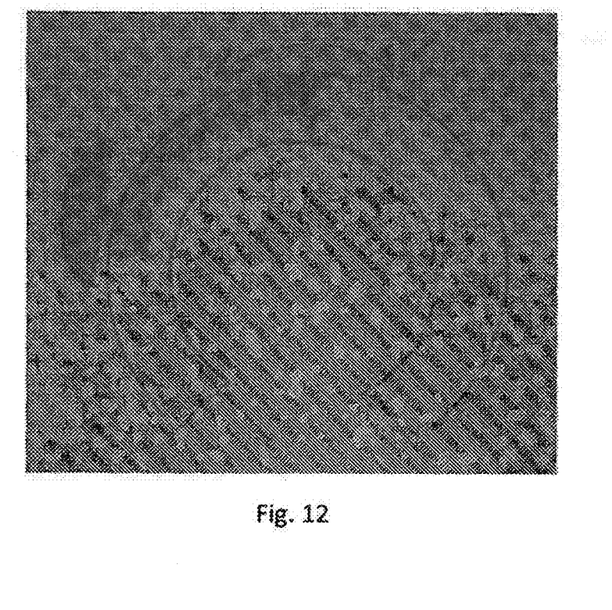
FIG. 12 shows another wire of the ring in FIG. 11.

FIGS. 11 and 12 shows a fifth embodiment of a pointing device according to the present invention. The figures shows a principle in which one or two outer ring segments 110 are movably in engagement with a groove in an inner ring segment 119, where the inner ring segment 119 is adapted to fit a finger, and where the inner ring segment 119 has a longer arc length than that of the one or two outer segments 110. The tip of the pointing device and its arm is fixed to one of the outer ring segments 110 or the outer ring segment 110. As is seen from the FIGS. 11 and 12 a protruding part 111 is protruding from the outer ring segment 111. The protruding part 111 includes the tip of the pointing device and the tip is adapted to interact with interactive displays.

A user of the pointing device according to the fifth embodiment will simply rotate the one or two outer ring segments 110 from an upper position, which is comfortable when the pointing device is not in use, to a side position where the protruding part 111 is on the left or right side of the carrying finger. In FIG. 11 the protruding part is shown on the left side of the finger. The upper position is on top of the finger carrying the pointing device and the side position is approximately 90° in any direction along the curvature defined by the inner ring segment 119 starting from the top of the finger/ring. From the protruding part 111 a pointing tip can be activated in the same manner as indicated for the wire/tip 68 in FIG. 6, or it may be a wire which is winded up in a spool in the protruding part 111. The wire/tip may be attached to the tip of a finger or the wire in itself may be stiff enough to be used in interaction with a display screen. Alternatively the tip of the wire may be designed so that it will fit well between two fingers when in use such as a pencil, i.e. under pressure between two neighbour fingers.

Figure 13:
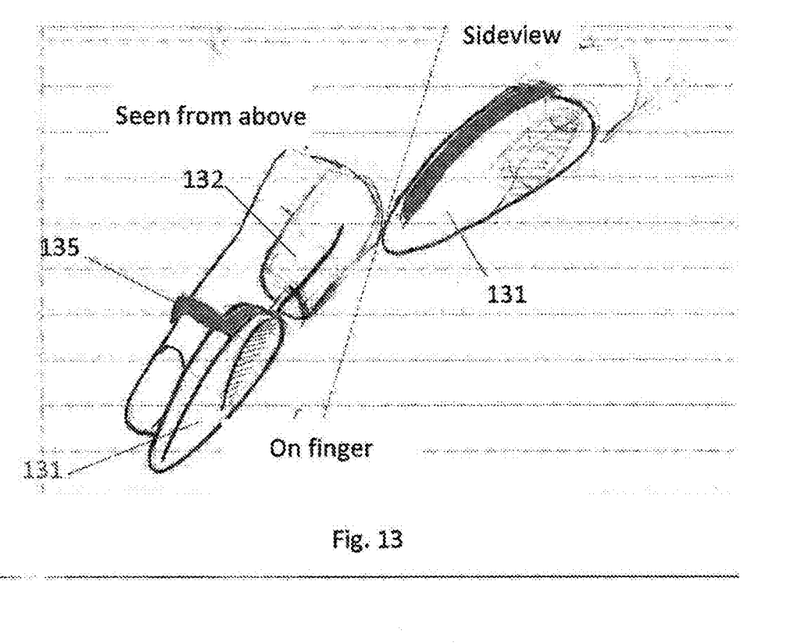
FIG. 13 shows an embodiment of a pointer device in a ring according to a sixth embodiment of the present invention and FIG. 14 shows another view of the ring in FIG. 12.
Figure 14:
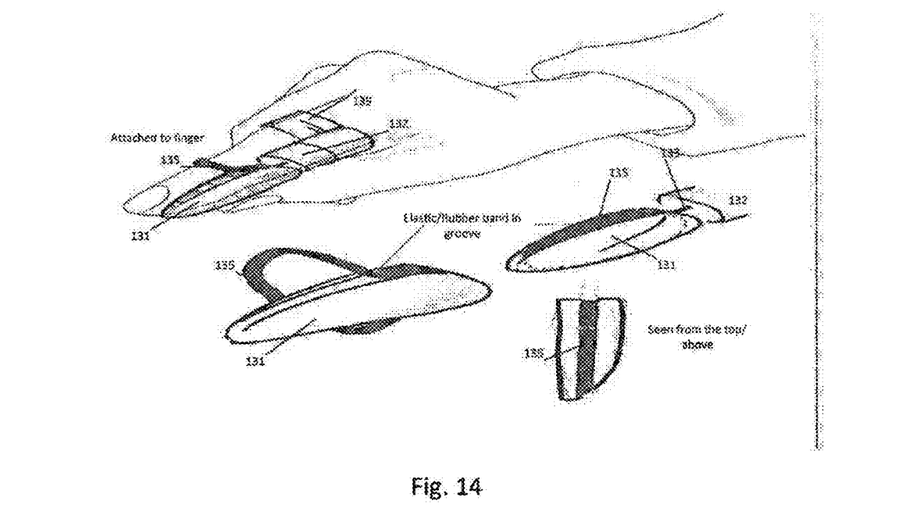

FIGS. 13 and 14 shows a sixth embodiment of a pointing device according to the present invention. The figures shows a principle where an elongated nail shaped part 131 is designed to be used as a pointing tip for interactive use with an interactive display. The nail shaped part 131, is adapted to fit into a holster 132. The nail shaped part 131 may be fixed to the tip of a finger by an elastic 135. In FIG. 14 the elastic 135 is adapted to be in a groove of the nail shaped part 131 when not in use. In use the elastic is released from parts of the groove and the released part of the elastic forms a loop which will fit around the tip of a finger. The elastic 135 may also be a non-elastic band provided that the size of the loop is adapted to fit a finger or if the attachment between the non-elastic band and the nail shaped part 131 is elastic or the band is spring mounted.

The hoister 132 is attached to a ring 139. The attachment to the ring 139 may be provided as a movable engagement as indicated in the fifth embodiment so that the holster 139 is fixed to one or more outer ring segment.

It can be seen from FIG. 14 that the nail shaped part 131 is anchored/fixed to the holster by a fixing means 133. The fixing means may be any of a rubber band/elastic, a wire or a cable. If the fixing mean is of a non-elastic type, a spring activated spooling mechanism may be arranged in the holster to accommodate the fixing means 133 when the nail shaped part 131 is in the holster 132.

The sixth embodiment may be combined with the second embodiment with reference to FIGS. 2-5. The tip 21 of the second embodiment may include an elastic as indicated in the sixth embodiment. The elastic can be hidden on the back/non visible part of the tip 21 when not in use or it can replace the wire indicated in the second embodiment of the present invention.

The invention claimed is:

1. A pointer device for operation of interactive screen surfaces, comprising:
a closed ring or a ring-shaped segment for wearing on a finger, wherein the closed ring or ring-shaped segment, comprises an outer ring and an inner ring defining a cavity therebetween, wherein the cavity is provided with an inner spool ring movable in relation to the inner and outer rings; and
an extractable pointer including an end face operative to contact a surface of the interactive screen, the extractable pointer moveable between a retracted state, in which substantially the entirety of the extractable pointer is retracted into the cavity of the closed ring or ring-shaped segment, and an extracted state, in which the extractable pointer is extended away from the cavity of the closed ring or ring-shaped segment, and the inner spool ring being operative to receive a wire or cord connected to the extractable pointer.

2. The pointer device of claim 1, wherein the end face is less than 25 mm$^2$.

3. The pointer device of claim 1, wherein the closed ring or ring-shaped segment comprises a ring extension arranged adjacent to a shoulder of the closed ring or ring-shaped segment, the ring extension being integrated in the closed ring or ring-shaped segment, the ring extension comprising an elongated groove running coaxially or approximately coaxially with the closed ring or ring-shaped segment, wherein a hole is arranged at a first end of the ring extension through which the extractable pointer is threaded.

4. The pointer device of claim 3, wherein in the retracted state, the extractable pointer is retracted into the hole, and wherein in the extracted state, the extractable pointer is extracted, from the hole, and wherein the pointer device further comprises a button, slideably arranged in the elongated groove so as to allow movement between the retracted and extracted states.

5. The pointer device of claim 1, wherein movement between the extracted and retracted states is actuated by rotation of at least a portion of the closed ring or ring-shaped element.

6. A pointer device for operation of interactive screen surfaces, comprising:
a closed ring or a ring-shaped segment for placement on a finger, wherein the closed ring or ring-shaped segment comprises:
an outer ring and an inner ring defining a cavity therebetween, wherein the cavity is provided with an inner spool ring movable in relation to the inner and outer rings, and
a ring extension arranged adjacent to a shoulder of the closed ring or ring-shaped segment, the ring extension being integrated in the closed ring or ring-shaped segment, the ring extension comprising an elongated groove running coaxially or approximately coaxially with the closed ring or ring-shaped segment, wherein a hole is arranged at a first end of the ring extension through which an extractable pointer is threaded; and
the extractable pointer including an end face operative to interact with the interactive screen, the extractable pointer moveable between a retracted state, in which substantially the entirety of the extractable pointer is retracted into the cavity of the closed ring or ring-shaped segment, and an extracted state, in which the extractable pointer is extended away from the cavity of the closed ring or ring-shaped segment, and the inner spool ring being operative to receive a wire or cord connected to the extractable pointer.

7. The pointer device of claim 6, wherein in the retracted state, the extractable pointer is retracted into the hole, and wherein in the extracted state, the extractable pointer is extracted from the hole, and wherein the pointer device further comprises a button, slideably arranged in the elongated groove so as to allow movement between the retracted and extracted states.

* * * * *